United States Patent
Kusase

(10) Patent No.: US 6,832,510 B2
(45) Date of Patent: Dec. 21, 2004

(54) ABNORMALITY DETECTING APPARATUS FOR A DRIVING SYSTEM OF AN AUTOMOTIVE GENERATOR-MOTOR DEVICE

(75) Inventor: Shin Kusase, Oobu (JP)

(73) Assignee: Denso Corporation, Kariya (JP)

(*) Notice: Subject to any disclaimer, the term of this patent is extended or adjusted under 35 U.S.C. 154(b) by 21 days.

(21) Appl. No.: 10/338,697

(22) Filed: Jan. 9, 2003

(65) Prior Publication Data

US 2003/0136594 A1 Jul. 24, 2003

(30) Foreign Application Priority Data

Jan. 21, 2002 (JP) ..................................... 2002-010925

(51) Int. Cl.[7] .......................... G01M 19/00; B60K 1/00
(52) U.S. Cl. ................................. 73/118.1; 180/65.4
(58) Field of Search .......................... 701/22; 73/118.1, 73/660, 116; 180/65.2, 65.4

(56) References Cited

U.S. PATENT DOCUMENTS

| | | | | |
|---|---|---|---|---|
| 4,783,998 A | * | 11/1988 | Sander | 73/660 |
| 5,823,280 A | * | 10/1998 | Lateur et al. | 180/65.2 |
| 6,190,283 B1 | * | 2/2001 | Uchida | 477/5 |

* cited by examiner

*Primary Examiner*—Edward Lefkowitz
*Assistant Examiner*—Octavia Davis
(74) *Attorney, Agent, or Firm*—Oliff & Berridge, PLC

(57) ABSTRACT

A rotational speed sensor and a first F/V converter cooperatively obtain a voltage signal representing a rotational speed of an engine. A second F/V converter obtains a voltage signal representing a rotational speed of a generator-motor device. A rotational speed difference detector produces a difference between two voltage signals. When the difference exceeds a predetermined value, a voltage comparator produces a high-level signal to activate a warning circuit.

5 Claims, 4 Drawing Sheets

ABNORMALITY DETECTING APPARATUS FOR A DRIVING SYSTEM OF AN AUTOMOTIVE GENERATOR-MOTOR DEVICE

BACKGROUND OF THE INVENTION

This invention relates to an abnormality detecting apparatus for a driving system of an automotive generator-motor device which is operable as a power generator or an electric motor.

Recently, there is a trend for an automotive generator usable as an electric motor so that the automotive generator can perform a power generating action as well as an electric motor action. For example, the automotive generator possessing the motor function can serve as a starter for an engine or an assistant power source for an engine available in a high-speed or severe driving condition. Especially, when this kind of generator-motor device selectively acting as a power generator or an electric more is used to start the engine or a vehicle, it is mandatorily required to generate a large starting torque as an electric motor and is also required to generate a large power output as a power generator.

The generator-motor device is generally connected to an engine via an endless driving belt entrained between pulleys attached their output/input shafts. A tension acting on this belt varies widely and causes the belt to undesirably or excessively stretch or wear. The excessively stretched driving belt may cause a slip. No driving force will be transmitted between the engine and the generator-motor device. The generator-motor device may suddenly stop its power generating action or electric motor action even when a vehicle is running on a road.

For the purpose of reducing the emission of harmful substances contained in exhaust gas or to improve the fuel economy, many of the vehicle drivers try to stop the rotation of the engine while they are forced to wait for the traffic signal turning into green (indicting a "go" sign) at a crossing or at an intersection. This is generally referred to as idling stop. To this end, the drivers frequently repeat startup and stop operations of the engine. Therefore, the driving belt entrained between the generator-motor device and the engine is subjected to large and frequent changes of the tension acting thereon. This induces excessive stretch and wear of the belt.

If the electric motor action is no longer feasible for the generator-motor device, it will be difficult to restart the engine of a vehicle which may be stopped at a crossing or at an intersection. If the power generating action is no longer feasible for the generator-motor device, it will be difficult to charge the battery and the engine will not be driven.

To avoid such emergent situations, it is desirable to promptly detect any abnormality of the driving belt, including excessive stretch and wear, before the belt loses its essential functions.

SUMMARY OF THE INVENTION

In view of the above-described problems, the present invention has an object to provide an abnormality detecting apparatus for a driving system of an automotive generator-motor device which is capable of promptly and accurately detecting excessive stretch or wear of a driving belt entrained between an engine and the generator-motor device.

In order to accomplish the above and other related objects, the present invention provides a first abnormality detecting apparatus for a driving system of an automotive generator-motor device which is connected to an automotive engine via a driving belt and is selectively operable as a power generator or an electric motor, characterized by the following features. A first rotational speed detecting means is provided for detecting a rotational speed of the automotive engine. A second rotational speed detecting means is provided for detecting a rotational speed of the generator-motor device based on an induced voltage of any one phase of a multiphase armature winding equipped in the generator-motor device. A rotational speed difference detecting means is provided for detecting a difference between the rotational speed detected by the first rotational speed detecting means and the rotational speed detected by the second rotational speed detecting means. And, a warning means is provided for giving a warning or alarm when a rotational speed difference detected by the rotational speed difference detecting means exceeds a predetermined value.

The driving belt connecting the engine and the generator-motor device causes a slip before it is fatally damaged. Under such a slipping condition, the driving belt cannot accurately transmit the rotation of the engine or the generator-motor device to the other. Similarly, an excessively stretched driving belt will cause a significant time lag in the transmission of a driving force between the engine and the generator-motor device.

The first abnormality detecting apparatus of the present invention steadily monitors the occurrence of such emergent conditions of the driving belt during the power generating action or during the electric motor action based on a difference between the rotational speed of the engine and the rotational speed of the generator-motor device. Then, the first abnormality detecting apparatus generates or gives a warning or alarm in advance before the driving belt loses its essential functions, thereby letting each vehicle driver know the abnormality, such as excessive stretch or wear, having been occurring on the driving belt. Hence, the vehicle driver can repair the worn or damaged driving belt at an early stage. Especially, the first abnormality detecting apparatus detects the rotational speed of the generator-motor device based on the induced voltage of any one phase of the multiphase armature winding equipped in the generator-motor device. This is advantageous in that the rotational speed detection of the generator-motor device can be accurately performed without requiring a hall device of any other expensive rotational speed sensor.

Furthermore, the present invention provides a second abnormality detecting apparatus for a driving system of an automotive generator-motor device which is connected to an automotive engine via a driving belt and is selectively operable as a power generator or an electric motor, characterized by the following features. A first rotational speed detecting means is provided for detecting a rotational speed of the automotive engine. A second rotational speed detecting means is provided for detecting a rotational speed of the generator-motor device based on a voltage appearing at a neutral point of a Y-connected multiphase armature winding equipped in the generator-motor device. A rotational speed difference detecting means is provided for detecting a difference between the rotational speed detected by the first rotational speed detecting means and the rotational speed detected by the second rotational speed detecting means. And, a warning means is provided for giving a warning or alarm when a rotational speed difference detected by the rotational speed difference detecting means exceeds a predetermined value.

According to the second abnormality detecting apparatus of the present invention, the rotational speed of the generator-motor device is detected based on the voltage appearing at the neutral point of the Y-connected multiphase armature winding equipped in the generator-motor device. This is also advantageous in that the rotational speed detection of the generator-motor device can be accurately performed without requiring a hall device of any other expensive rotational speed sensor. Therefore, the vehicle driver can know the abnormality of the driving belt, such as excessive stretch or wear, at an early stage. Furthermore, the voltage change at the neutral point reflects any abnormality caused in the multiphase armature winding. Thus, it becomes possible to generate or give a warning or alarm based on a different kind of abnormality. As a result, the second abnormality detecting apparatus makes it possible to prevent power generation failure induced by an abnormality of the multiphase armature winding as well as engine startup failure induced by this power generation failure.

Furthermore, the present invention provides a third abnormality detecting apparatus for a driving system of an automotive generator-motor device which is connected to an automotive engine via a driving belt and is selectively operable as a power generator or an electric motor, characterized by the following features. A first angular acceleration detecting means is provided for detecting an angular acceleration of the automotive engine. A second angular acceleration detecting means is provided for detecting an angular acceleration of the generator-motor device. An angular acceleration difference detecting means is provided for detecting a difference between the angular acceleration detected by the first angular acceleration detecting means and the angular acceleration detected by the second angular acceleration detecting means. And, a warning means is provided for giving a warning or alarm when an angular acceleration difference detected by the angular acceleration difference detecting means exceeds a predetermined value.

The third abnormality detecting apparatus of the present invention steadily monitors the occurrence of emergent conditions of the driving belt during the power generating action or during the electric motor action based on a difference between the angular acceleration of the engine and the angular acceleration of the generator-motor device. Thus, the vehicle driver can know the abnormality of the driving belt, such as excessive stretch or wear, at an early stage. Furthermore, the third abnormality detecting apparatus is advantageous in that instantaneous and responsive abnormality of the driving belt can be detected adequately. Thus, the third abnormality detecting apparatus makes it possible to promptly and accurately detect any abnormality in the driving system.

Preferably, the second angular acceleration detecting means detects the angular acceleration of the generator-motor device based on an induced voltage of any one phase of a multiphase armature winding equipped in the generator-motor device. This is advantageous in that the angular acceleration detection of the generator-motor device can be accurately performed without requiring an expensive angular acceleration sensor.

Preferably, the second angular acceleration detecting means detects the angular acceleration of the generator-motor device based on a voltage appearing at a neutral point of a Y-connected multiphase armature winding equipped in the generator-motor device. This is also advantageous in that the angular acceleration detection of the generator-motor device can be accurately performed without requiring an expensive angular acceleration sensor. Furthermore, it becomes possible to detect any power generation failure induced by an abnormality of the multiphase armature winding.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
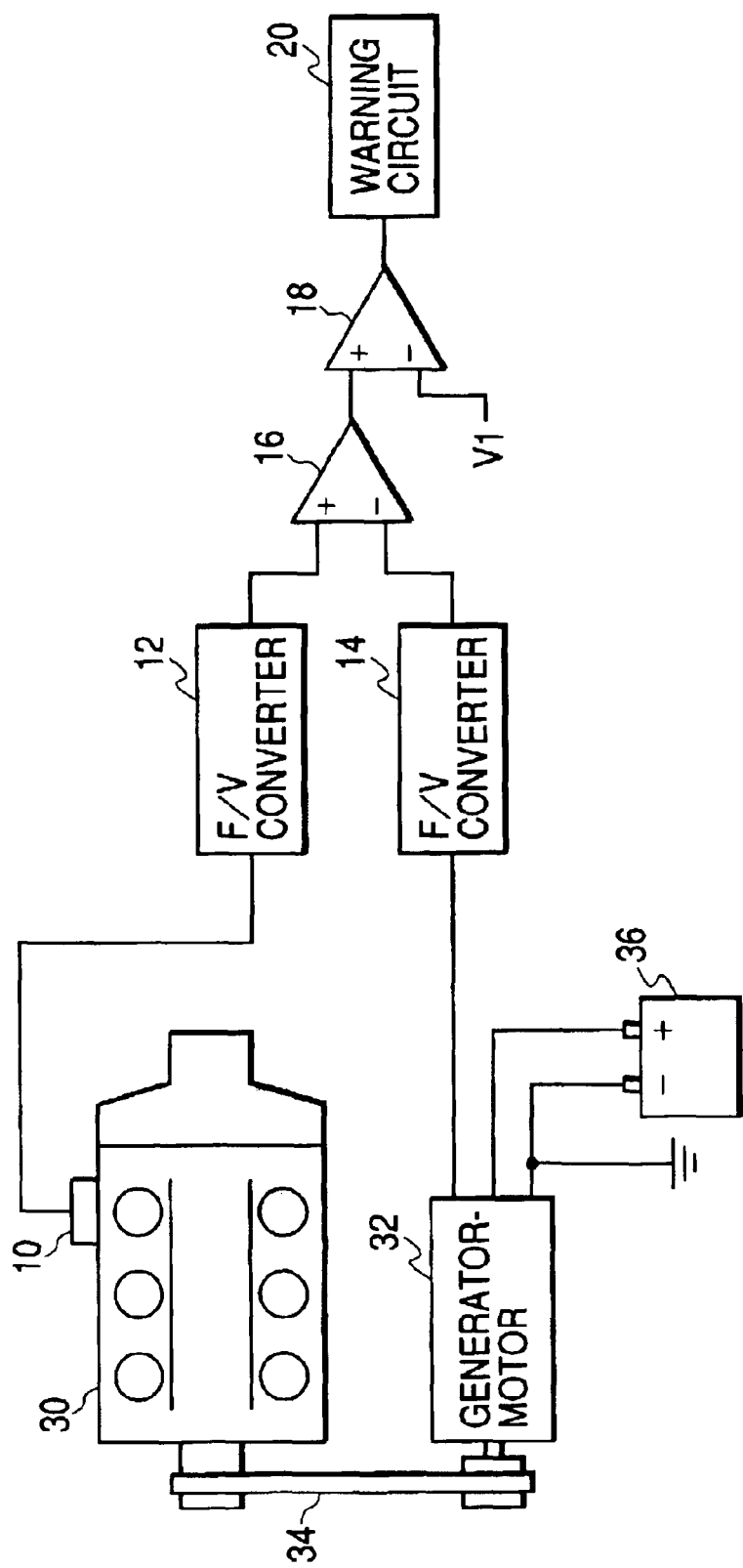
FIG. 1 is a circuit diagram showing a schematic arrangement of an abnormality detecting apparatus for a driving system of an automotive generator-motor device in accordance with a preferred embodiment of the present invention.

Preferred embodiments of the present invention will be explained hereinafter with reference to attached drawings. Identical parts are denoted by the same reference numerals or signs throughout the drawings.

An abnormality detecting apparatus for a driving system of an automotive generator-motor device in accordance with a preferred embodiment of the present invention will be explained with reference to attached drawings.

FIG. 1 is a circuit diagram showing a schematic arrangement of an abnormality detecting apparatus for a driving system of an automotive generator-motor device in accordance with a preferred embodiment of the present invention.

As shown in FIG. 1, an automotive engine (e.g., an internal combustion engine) 30 is connected to a generator-motor device 32 via an endless driving belt 34 entrained between the pulleys attached to their output/input shafts. A driving force is transmitted via the belt 34 from the automotive engine 30 to the generator-motor device 32 or vice versa. More specifically, when the engine 30 generates a driving force, it is transmitted via the belt 34 to the generator-motor device 32. The generator-motor device 32 operates as a generator to charge a battery 36 which is placed in the vicinity of the generator-motor device 32 in an engine compartment (not shown). On the contrary, a driving force generated from the generator-motor device 32 is transmitted via the belt 34 to the engine 30, when the generator-motor device 32 operates as an electric motor in an engine startup condition.

The abnormality detecting apparatus shown in FIG. 1 is for detecting a difference between a rotational speed of the engine 30 and a rotational speed of the generator-motor device 32 and for generating or giving a warning or alarm based on a detected rotational speed difference. To this end, the abnormality detecting apparatus shown in FIG. 1 includes a rotational speed sensor 10, a first F/V (i.e., frequency/voltage) converter 12, a second F/V converter 14, a rotational speed difference detector 16, a voltage comparator 18, and a warning circuit 20.

The rotational speed sensor 10, provided in the engine 30, detects a rotational speed of an engine output shaft and produces a signal having a frequency proportional to the detected engine rotational speed. For example, the rotational speed sensor 10 is already equipped in the engine 30 to output a pulse signal representing the engine rotational speed for the use in an engine control or for the use in a navigation system. In this respect, the conventionally equipped engine rotational speed sensor is directly usable for the rotational speed sensor 10 for the abnormality detecting apparatus of this embodiment.

The first F/V converter 12 produces a voltage signal representing the frequency of an output signal of the rotational speed sensor 10. The second F/V converter 14 produces a voltage signal representing the frequency of an output signal of the generator-motor device 32 which is proportional to the rotational speed of the generator-motor device 32. When the rotational speed of engine 30 is equal to the rotational speed of generator-motor device 32, the output voltage of first F/V converter 12 is equal to the output voltage of second F/V converter 14.

The rotational speed difference detector 16 has a non-inverting input terminal for inputting the output voltage of first F/V converter 12 and an inverting input terminal for inputting the output voltage of second F/V converter 14. Furthermore, the rotational speed difference detector 16 has an output terminal for outputting a voltage signal representing a difference between the output voltage of first F/V converter 12 and the output voltage of second F/V converter 14. In other words, the rotational speed difference detector 16 detects a difference between a rotational speed of the engine 30 and a rotational speed of the generator-motor device 32. A differential amplifier is preferably used for the rotational speed difference detector 16.

The voltage comparator 18 has a non-inverting input terminal for inputting the output voltage of rotational speed difference detector 16 and an inverting input terminal for inputting a reference voltage V1. Furthermore, the voltage comparator 18 has an output terminal for outputting a binary signal based on the comparison between the output voltage of detector 16 and the reference voltage V1. In this respect, the voltage comparator 18 makes a judgement as to whether the rotational speed difference between the engine 30 and the generator-motor device 32 is within a predetermined allowable range. When the output voltage of detector 16 is larger than the reference voltage V1, i.e., when the rotational speed difference between the engine 30 and the generator-motor device 32 exceeds the predetermined allowable range, the binary output signal of voltage comparator 18 turns from a low level to a high level.

The warning circuit 20 performs a predetermined warning action in response to a high-level output signal of the voltage comparator 18. In other words, the warning circuit 20 generates or gives a warning or alarm when the rotational speed difference between the engine 30 and the generator-motor device 32 exceeds the predetermined allowable range. For example, an indication lamp (not shown) is provided on an instrument panel or on a dashboard in a passenger compartment, and it flashes or turns red to notify a driver of occurrence of abnormality when the warning circuit 20 performs the warning action. It is also possible to use a buzzer or other sound source in addition to the indication lamp.

Figure 2:
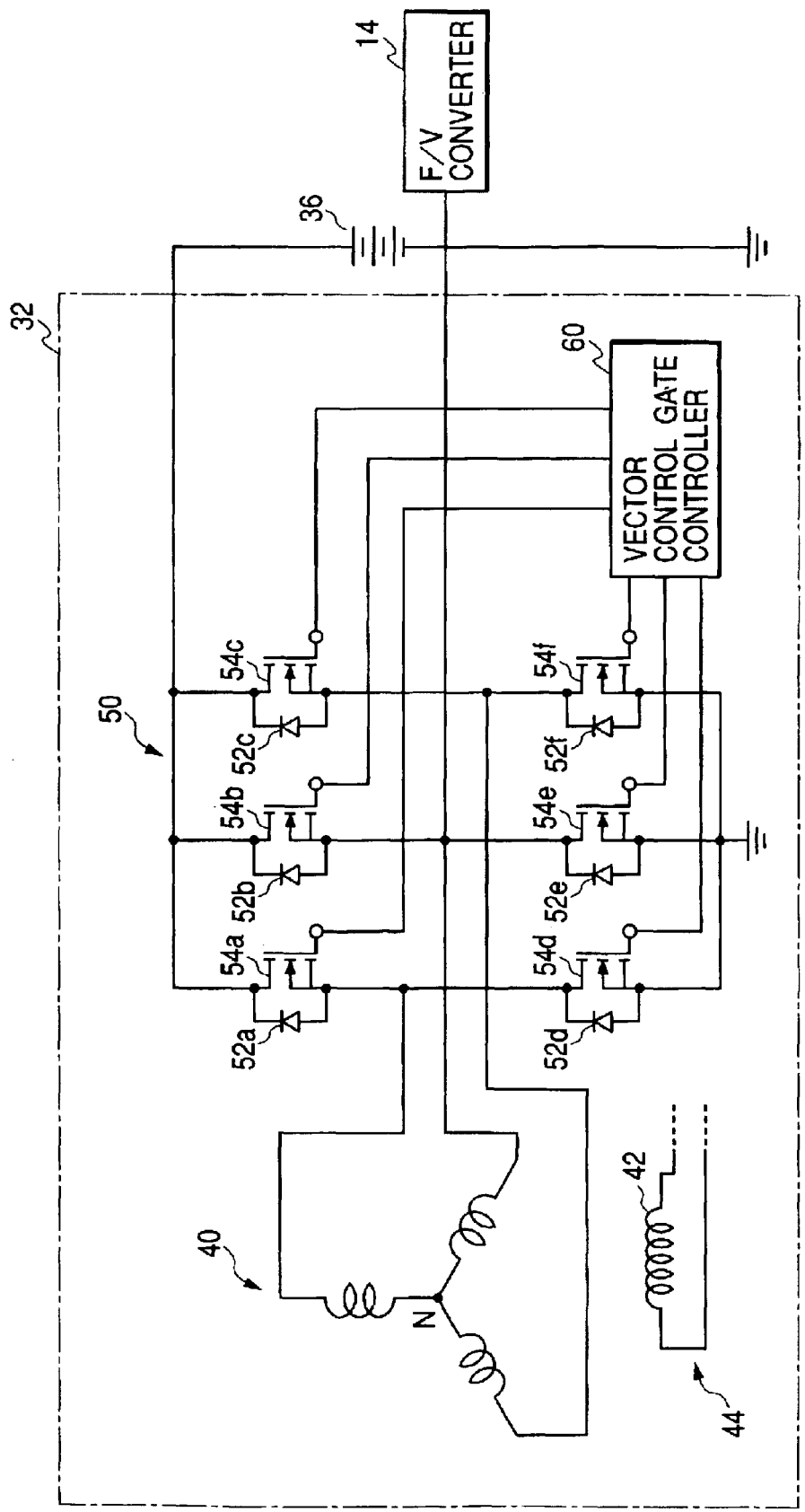
FIG. 2 is a circuit diagram showing a detailed arrangement of the automotive generator-motor device shown in FIG. 1.

FIG. 2 is a circuit diagram showing a detailed arrangement of the generator-motor device 32 shown in FIG. 1.

As shown in FIG. 2, the generator-motor device 32 includes a three-phase armature winding 40 serving as a multiphase armature winding constituting an armature wound around an armature core (not shown). A rotor 44 generates a magnetic field in response to a field current flowing across a field winding 42. The generated magnetic field is supplied to the armature. The three-phase armature winding 40 is connected to an AC/DC power converter 50. The AC/DC power converter 50 receives the three-phase AC voltage produced from the three-phase armature winding 40 and performs a first converting action for converting the received three-phase AC voltage into a DC voltage. The battery 36 is connected to the AC/DC power converter 50. The AC/DC power converter 50 receives a DC voltage applied from the battery 36 and performs a second converting action for converting the applied DC voltage into an AC voltage. A vector control gate controller 60 is provided to control the AC/DC power converter 50.

The three-phase armature winding 40 consists of three phase winding portions connected in a Y-connected pattern. The three phase winding portions of the three-phase armature winding 40 are commonly connected at a neutral point N. The other ends of respective phase winding portions are connected to the corresponding terminals of the AC/DC power converter 50. The second F/V converter 14 is commonly connected to one of the terminals for the three phase winding portions in the AC/DC power converter 50. In other words, the induced voltage of this particular phase (winding portion) of the multiphase armature winding is applied to the second F/V converter 14.

The AC/DC power converter 50 includes a total of six diodes 52a to 52f and a total of six power MOSFETs 54a to 54f. One diode 52i (i=a,b, - - - f) and one power MOSFET 54i (i=a,b, - - - f), forming a combination or a pair, are connected in parallel with each other. Each power MOSFET 54i (i=a,b, - - - f) has a function of selectively connecting or disconnecting both ends of the corresponding diode 52i (i=a,b, - - - f) in response to a control signal supplied from the vector control gate controller 60. When the vector control gate controller 60 opens all of the six power MOSFETs 54a to 54f, all of the diodes 52a to 52f perform the rectifying action so that the generator-motor device 32 performs the power generating action for charging the battery 36. On the other hand, when the vector control gate controller 60 closes all of the six power MOSFETs 54a to 54f, the electric power of the battery 36 is supplied to the three-phase armature winding 40 to produce a rotating magnetic field.

The above-described rotational speed sensor 10 and the first F/V converter 12 cooperatively serve as a first rotational speed detecting means of the present invention. The second F/V converter 14 serves as a second rotational speed detecting means of the present invention. The rotational speed difference detector 16 serves as the rotational speed difference detecting means of the present invention. The voltage comparator 18 and the warning circuit 20 cooperatively serve as a warning means of the present invention.

The above-described abnormality detecting apparatus for a driving system of an automotive generator-motor device operates in the following manner.

In the startup condition of the engine 30, the generator-motor device 32 performs an electric motor action to serve as a starter for driving the engine 30. Then, after the engine 30 starts rotating at self-sustainable levels, the generator-motor device 32 performs a power generating action to charge the battery 36. The engine 30 may keep an idling condition for a relatively long time due to traffic congestion or when a vehicle is forcibly stopped at an intersection or the like. In such a condition, a vehicle driver may stop the rotation of engine 30. However, once traveling conditions are satisfied, the vehicle driver causes the generator-motor device 32 to drive the engine 30. So, the driver can enjoy a traveling or cruising on the vehicle driven by the engine 30.

Under the above-described daily driving situations, the abnormality detecting apparatus for a driving system of an automotive generator-motor device of this embodiment steadily monitors the rotational speed of engine 30 as well as the rotational speed of generator-motor 32. When a difference between the rotational speed of engine 30 and the rotational speed of generator-motor 32 exceeds a predetermined value, the warning circuit 20 generates or gives a predetermined warning or alarm to inform a vehicle driver of occurrence of abnormality in the driving system (especially, the driving belt 34).

Accordingly, it becomes possible to detect slipping or any other deterioration in the belt transmitting ability due to excessive stretch or wear of the driving belt which may be caused by worn-out V-belt threads (in case of a polyurethane V-belt having a plurality of teeth). With this arrangement, a warning or alarm is given to a vehicle driver in advance before the driving belt completely loses its essential functions so as to encourage the driver to repair the belt at an earlier stage.

Figure 3:
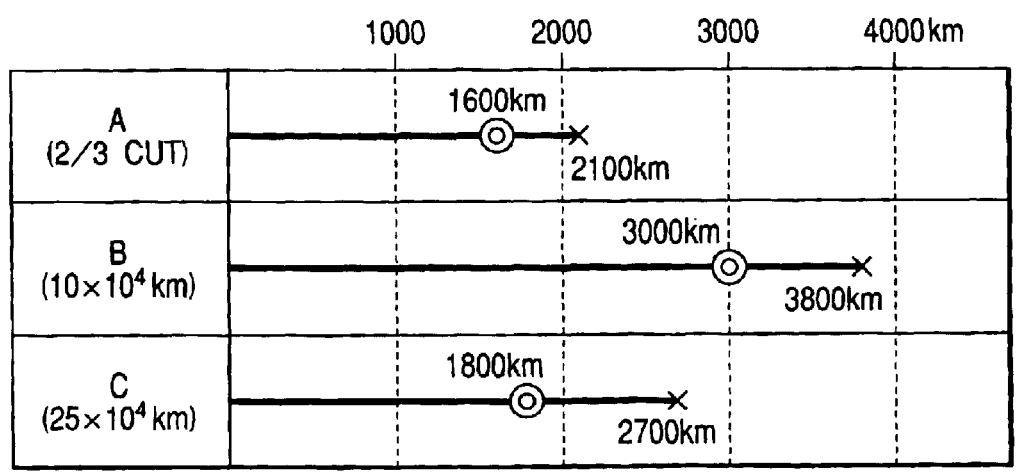
FIG. 3 is a diagram showing experimental data obtained through practical engine tests using deteriorated or worn belts.

FIG. 3 shows experimental data obtained through practical engine tests using deteriorated or worn belts. The belts prepared for the engine tests are a total of three kinds of samples A, B, and C which are polyurethane V-belts for an automotive alternator and are differently deteriorated or worn out. The sample A is a V-belt with teeth ⅔ of whose top is cut. The sample B is a V-belt having endured a $10 \times 10^4$ km test driving. The sample C is a V-belt having endured a $25 \times 10^4$ km test driving. In FIG. 3, a sign X indicates a traveling distance at which the tested belt was broken and a sign ⊚ indicates a traveling distance at which a warning or alarm was generated from the warning circuit 20 of the abnormality detecting apparatus of this embodiment. These engine tests were performed on a vehicle equipped with the engine 30 of a 3,000 cc ($=3 \times 10^{-3}$ m$^3$) and the generator-motor 32 having a rated output of 3 kW.

From the test data shown in FIG. 3, it is understood that the generation of warning or alarm was done at an appropriate timing (at a traveling distance of 500 km to 900 km prior to the breakage of belt). Accordingly, the vehicle driver can perceive the occurrence of abnormality on the driving belt at an earlier stage and can bring his/her vehicle into a repair shop.

Furthermore, according to the abnormality detecting apparatus for a driving system of an automotive generator-motor device of this embodiment, the rotational speed of the generator-motor 32 is detected based on any one phase voltage of the three-phase armature winding 40. This is advantageous in that the rotational speed detection of the generator-motor 32 can be accurately performed without requiring a hall device of any other expensive rotational speed sensor.

The present invention is not limited to the above-described embodiment and can be variously modified within the scope of the present invention. For example, the rotational speed detection of the generator-motor 32 can be accurately performed based on a voltage appearing at a neutral point N of the three-phase armature winding 40. In this case, the second F/V converter 14 is directly connected to the neutral point N of the three-phase armature winding 40. The second F/V converter 14 produces a voltage signal representing the frequency of an output signal of the generator-motor device 32 which is proportional to the rotational speed of the generator-motor device 32. Even in such a modified embodiment, it is possible to accurately detect the rotational speed of the generator-motor 32 without requiring a hall device of any other expensive rotational speed sensor. Therefore, the vehicle driver can know the abnormality of the driving belt, such as excessive stretch or wear, at an early stage. Furthermore, the voltage change at the neutral point N reflects any abnormality caused in the three-phase armature winding 40. For example, a third-order harmonic content appears at the neutral point N when the three-phase armature winding 40 is normal. However, the third-order harmonic content changes into a fundamental harmonic content when any one phase winding portion is opened. This kind of abnormality is immediately detectable in the same manner as the abnormality detection based on the rotational speed difference. Thus, it becomes possible to generate or give a warning or alarm based on a different kind of abnormality. As a result, this modified embodiment makes it possible to prevent power generation failure induced by an abnormality of the three-phase armature winding 40 as well as startup failure of the engine 30 induced by this power generation failure.

Although the above-described embodiment detects the abnormality of driving belt 34 based on the rotational speed difference between engine 30 and generator-motor 32, it is also possible to detect the abnormality of driving belt 34 based on an angular acceleration difference between engine 30 and generator-motor 32.

Figure 4:
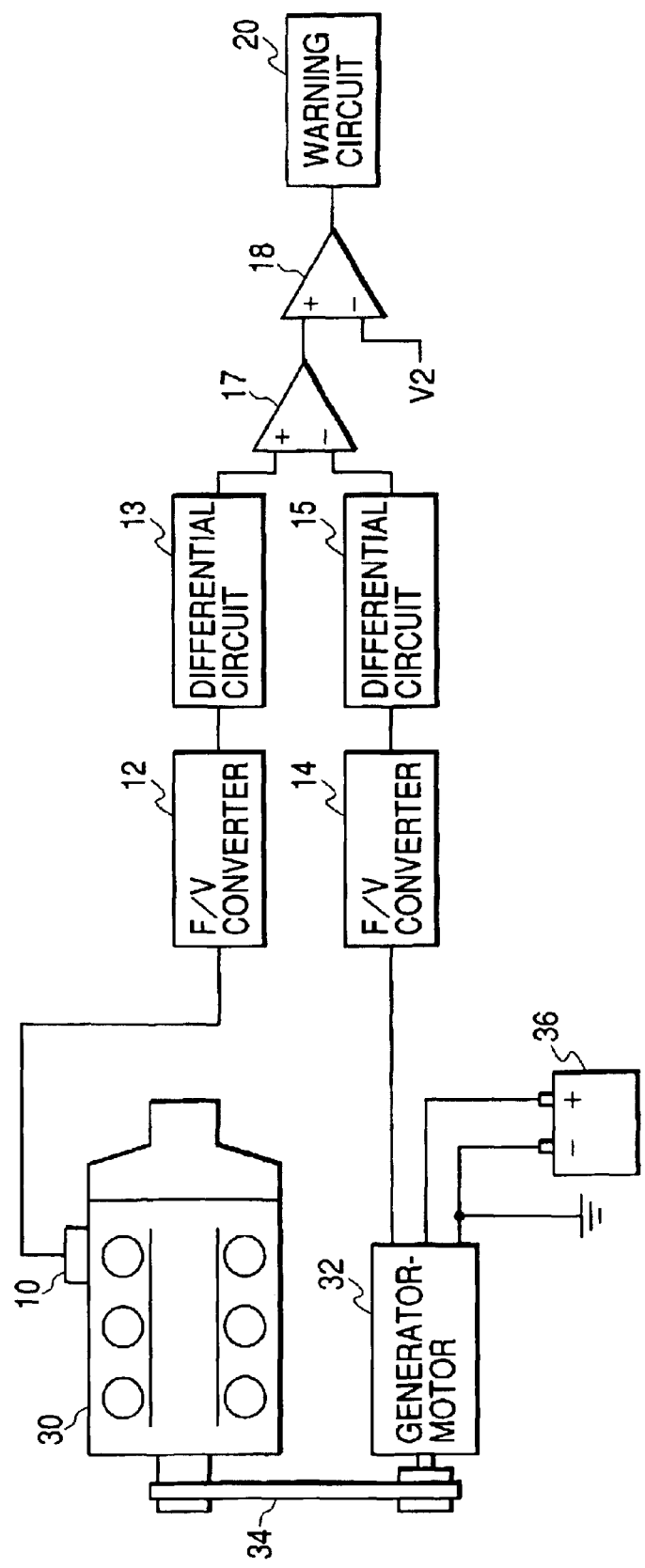
FIG. 4 is a circuit diagram showing a schematic arrangement of an abnormality detecting apparatus for a driving system of an automotive generator-motor device in accordance with another preferred embodiment of the present invention.

FIG. 4 is a circuit diagram showing a schematic arrangement of an abnormality detecting apparatus for a driving system of an automotive generator-motor device in accordance with another preferred embodiment of the present invention.

As shown in FIG. 4, the automotive engine (e.g., an internal combustion engine) 30 is connected to the generator-motor device 32 via the endless driving belt 34 entrained between the pulleys attached to their output/input shafts. Like the embodiment shown in FIG. 1, the generator-motor device 32 operates as a power generator to charge the battery 36 or an electric motor to drive the engine 30 in a startup operation. To this end, a driving force is mutually transmitted between the automotive engine 30 and the generator-motor device 32 via the belt 34.

The abnormality detecting apparatus shown in FIG. 4 is for detecting a difference between an angular acceleration of the engine 30 (more specifically, an angular acceleration of an engine output shaft) and an angular acceleration of the generator-motor device 32 (more specifically, an angular acceleration of a generator-motor output shaft) and for generating or giving a warning or alarm based on a detected angular acceleration difference. To this end, the abnormality detecting apparatus shown in FIG. 4 includes a first differential circuit 13, a second differential circuit 15, and an angular acceleration difference detector 17, in addition to the rotational speed sensor 10, the first F/V converter 12, the second F/V converter 14, the voltage comparator 18, and the warning circuit 20.

The first differential circuit 13 is connected to the first F/V converter 12 to receive a voltage signal representing the rotational speed of the engine 30. The first differential circuit 13 obtains a differential value of the voltage signal representing the rotational speed of the engine 30. In other words, the first differential circuit 13 produces a differential signal representing an angular acceleration of engine 30 (i.e., an angular acceleration of the engine output shaft). The second differential circuit 15 is connected to the second F/V converter 14 to receive a voltage signal representing the rotational speed of the generator-motor device 32. The second differential circuit 15 obtains a differential value of the voltage signal representing the rotational speed of the generator-motor device 32. In other words, the second differential circuit 15 produces a differential signal representing an angular acceleration of generator-motor device 32 (i.e., an angular acceleration of the generator-motor output shaft).

The angular acceleration difference detector 17 has a non-inverting input terminal for inputting the differential signal of first differential circuit 13 and an inverting input terminal for inputting the differential signal of second differential circuit 15. Furthermore, the angular acceleration difference detector 17 has an output terminal for outputting a voltage signal representing a difference between the differential signal of first differential circuit 13 and the differential signal of second differential circuit 15. In other words, the angular acceleration difference detector 17 detects a difference between an angular acceleration of the engine 30 and an angular acceleration of the generator-motor device 32. A differential amplifier is preferably used for the angular acceleration difference detector 17.

The voltage comparator 18 has a non-inverting input terminal for inputting the output voltage of angular acceleration difference detector 17 and an inverting input terminal for inputting a reference voltage V2. Furthermore, the voltage comparator 18 has an output terminal for outputting a binary signal based on the comparison between the output voltage of detector 17 and the reference voltage V2. In this respect, the voltage comparator 18 makes a judgement as to whether the angular acceleration difference between the engine 30 and the generator-motor device 32 is within a predetermined allowable range. When the output voltage of detector 17 is larger than the reference voltage V2, i.e., when the angular acceleration difference between the engine 30 and the generator-motor device 32 exceeds the predetermined allowable range, the binary output signal of voltage comparator 18 turns from a low level to a high level.

The warning circuit 20 performs a predetermined warning action in response to a high-level output signal of the voltage comparator 18. In other words, the warning circuit 20 generates or gives a warning or alarm when the angular acceleration difference between the engine 30 and the generator-motor device 32 exceeds the predetermined allowable range. As described above, the indication lamp (not shown) on the instrument panel or on the dashboard in the passenger compartment flashes or turns red to notify a driver of occurrence of abnormality when the warning circuit 20 performs the warning action. A buzzer or other sound source can be also used in addition to the indication lamp.

The method for obtaining the rotational speed of generator-motor 32 by using the second F/V converter 14 is the same as that of the above-described embodiment. Namely, as shown in FIG. 2, any phase voltage of the three-phase armature winding 40 is detected by the second F/V converter 14. Alternatively, the voltage appearing at the neutral point N of the three-phase armature winding 40 is detectable by the second F/V converter 14.

The above-described rotational speed sensor 10, the first F/V converter 12, and the first differential circuit 13 cooperatively serve as a first angular acceleration detecting means of the present invention. The second F/V converter 14 and the second differential circuit 15 cooperatively serves as a second angular acceleration detecting means of the present invention. The angular acceleration difference detector 17 serves as the angular acceleration difference detecting means of the present invention. The voltage comparator 18 and the warning circuit 20 cooperatively serve as a warning means of the present invention.

The above-described abnormality detecting apparatus for a driving system of an automotive generator-motor device operates in the following manner.

In this manner, the rotational speed difference between engine 30 and generator-motor 32 is detectable as an angular acceleration difference between engine 30 and generator-motor 32. Thus, it becomes possible to accurately detect the abnormality of driving belt 34, such as excessive stretch or wear, at an early stage. Furthermore, this embodiment makes it possible to detect instantaneous and responsive abnormality of the driving belt. Thus, it becomes possible to promptly and accurately detect any abnormality in the driving system.

What is claimed is:

1. An abnormality detecting apparatus for a driving system of an automotive generator-motor device which is connected to an automotive engine via a driving belt and is selectively operable as a power generator or an electric motor, comprising:

first rotational speed detecting means for detecting a rotational speed of said automotive engine;

second rotational speed detecting means for detecting a rotational speed of said generator-motor device connected via said driving belt to said automotive engine based on an induced voltage of any one phase of a multiphase armature winding equipped in said generator-motor device;

rotational speed difference detecting means for detecting a difference between said rotational speed of said automotive engine detected by said first rotational speed detecting means and said rotational speed of said generator-motor device detected by said second rotational speed detecting means; and warning means for giving a warning or alarm to inform an abnormality of said driving belt when a rotational speed difference detected by said rotational speed difference detecting means exceeds a predetermined value.

2. An abnormality detecting apparatus for a driving system of an automotive generator-motor device which is connected to an automotive engine via a driving belt and is selectively operable as a power generator or an electric motor, comprising:

first rotational speed detecting means for detecting a rotational speed of said automotive engine;

second rotational speed detecting means for detecting a rotational speed of said generator-motor device connected via said driving belt to said automotive engine based on a voltage appearing at a neutral point of Y-connected multiphase armature winding equipped in said generator-motor device;

rotational speed difference detecting means for detecting a difference between said rotational speed of said automotive engine detected by said first rotational speed detecting means and said rotational speed of said generator-motor device detected by said second rotational speed detecting means; and warning means for giving a warning or alarm to inform an abnormality of said driving belt when a rotational speed difference detected by said rotational speed difference detecting means exceeds a predetermined value.

3. An abnormality detecting apparatus for a driving system of an automotive generator-motor device which is connected to an automotive engine via a driving belt and is selectively operable as a power generator or an electric motor, comprising:

first angular acceleration detecting means for detecting an angular acceleration of said automotive engine;

second angular acceleration detecting means for detecting an angular acceleration of said generator-motor device connected via said driving belt to said automotive engine;

angular acceleration difference detecting means for detecting a difference between said angular acceleration of said automotive engine detected by said first angular acceleration detecting means and said angular acceleration of said generator-motor device detected by said second angular acceleration detecting means; and warning means for giving a warning or alarm to inform an abnormality of said driving belt when an angular acceleration difference detected by said angular acceleration difference detecting means exceeds a predetermined value.

4. The abnormality detecting apparatus for a driving system of an automotive generator-motor device in accordance with claim 3, wherein said second angular acceleration detecting means detects the angular acceleration of said generator-motor device based on an induced voltage of any one phase of a multiphase armature winding equipped in said generator-motor device.

5. The abnormality detecting apparatus for a driving system of an automotive generator-motor device in accordance with claim 3, wherein said second angular acceleration detecting means detects the angular acceleration of said generator-motor device based on a voltage appearing at a neutral point of a Y-connected multiphase armature winding equipped in said generator-motor device.

* * * * *